US010494983B2

(12) United States Patent
Morota et al.

(10) Patent No.: US 10,494,983 B2
(45) Date of Patent: Dec. 3, 2019

(54) VALVE DEVICE WITH FAIL-SAFE MECHANISM

(71) Applicant: NIPPON THERMOSTAT CO., LTD., Tokyo (JP)

(72) Inventors: Junichi Morota, Tokyo (JP); Hiroshi Suda, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 0 days.

(21) Appl. No.: 15/780,637

(22) PCT Filed: Oct. 5, 2016

(86) PCT No.: PCT/JP2016/079585
§ 371 (c)(1),
(2) Date: Jun. 1, 2018

(87) PCT Pub. No.: WO2017/130468
PCT Pub. Date: Aug. 3, 2017

(65) Prior Publication Data
US 2018/0347448 A1    Dec. 6, 2018

(30) Foreign Application Priority Data

Jan. 29, 2016   (JP) ................................. 2016-014996

(51) Int. Cl.
*F01P 7/14*        (2006.01)
*F16K 11/085*      (2006.01)
(Continued)

(52) U.S. Cl.
CPC .............. *F01P 7/14* (2013.01); *F16K 11/085* (2013.01); *F16K 17/38* (2013.01); *F16K 31/002* (2013.01);
(Continued)

(58) Field of Classification Search
CPC ............. Y10T 137/7737; F16K 31/002; F16K 17/003; F16K 17/38; F16K 11/085; F01P 7/14; F01P 2007/146; F01P 2031/00
See application file for complete search history.

(56) References Cited

U.S. PATENT DOCUMENTS 2,966,164 A * 12/1960 Britton .................. F16K 17/003
                                              137/543.21
8,820,706 B2 * 9/2014 Kawauchi ............... F16K 5/205
                                              251/180

(Continued)

FOREIGN PATENT DOCUMENTS

JP      2015218763 A    12/2015
WO      2014148126 A1    9/2014

OTHER PUBLICATIONS

Machine Translation of JP2015218763A (retrieved Jul. 2019) (Year: 2019).*

(Continued)

*Primary Examiner* — Jessica Cahill
(74) *Attorney, Agent, or Firm* — Isshiki International Law Office; Joseph P. Farrar, Esq.

(57) ABSTRACT

A valve device with fail-safe mechanism capable of improved production efficiency includes a valve element, a valve element housing, a third communication port provided in the valve element housing, and a fail-safe mechanism. The fail-safe mechanism includes a thermo-element and an element housing that houses the thermo-element. The element housing has a large-diameter housing, a small-diameter housing portion that accommodates the thermo-element, and a step. A valve element communicating portion communicating with the valve element housing is provided to the small-diameter housing portion. The fail-safe mechanism includes a valve plate member for closing the step and a coil spring that biases the valve plate member. A third (Continued)

adapter provided to the third communication port is provided with a through-hole that enables the large-diameter housing portion and the third communication port to communicate with each other.

5 Claims, 9 Drawing Sheets

(51) Int. Cl.
*F16K 17/38* (2006.01)
*F16K 31/00* (2006.01)
(52) U.S. Cl.
CPC ..... *F01P 2007/146* (2013.01); *F01P 2031/00* (2013.01)

(56) References Cited

U.S. PATENT DOCUMENTS

| 2005/0224592 A1* | 10/2005 | Inoue | F01P 7/16 236/101 R |
| 2013/0058799 A1* | 3/2013 | Scarpinato | F04B 49/06 417/53 |
| 2013/0112763 A1* | 5/2013 | Roman | F16K 31/002 236/101 R |
| 2014/0224361 A1* | 8/2014 | Warnery | F01P 7/167 137/625 |
| 2015/0118076 A1* | 4/2015 | Grassbaugh | F16K 15/023 417/292 |
| 2016/0010536 A1* | 1/2016 | Murakami | F16K 11/085 137/625.44 |
| 2018/0119828 A1* | 5/2018 | Ozeki | F16K 11/0856 |
| 2018/0119836 A1* | 5/2018 | Ozeki | F01P 3/18 |

OTHER PUBLICATIONS

International Search Report (ISR) for Application No. PCT/JP2016/079585 dated Dec. 27, 2016.
Translation of the ISR for Application No. PCT/JP2016/079585 dated Dec. 27, 2016.
Written Opinion of the International Search Authority for Application No. PCT/JP2016/079585 dated Dec. 27, 2016.

* cited by examiner

VALVE DEVICE WITH FAIL-SAFE MECHANISM

CROSS-REFERENCE TO RELATED APPLICATIONS

The present application is a national phase entry under 35 U.S.C. § 371 of International Application No. PCT/JP2016/079585, filed Oct. 5, 2016, which claims priority from Japanese Application No. 2016-014996, filed Jan. 29, 2016, the entire disclosures of each of which are hereby incorporated by reference herein.

TECHNICAL FIELD

The present invention relates to a valve device with a fail-safe mechanism used for controlling the flow rate of a coolant for automobiles, for example.

BACKGROUND ART

Conventionally, a valve device with a fail-safe mechanism is known that is comprised of a valve element; a valve element housing that rotatably accommodates the valve element as well as has a valve element side opening for taking in automotive coolant that has cooled the cylinder head or the like; three communication ports, from first to third, that are connected to a radiator or the like mounted on the valve element housing; and a fail-safe mechanism (see, for example, Patent Document 1).

The fail-safe mechanism of Patent Document 1 includes a thermo-element and an element housing that accommodates the thermo-element. The element housing includes a small-diameter housing for accommodating the thermo-element, a large-diameter housing having an inner diameter of larger diameter than the inner diameter of the small-diameter housing, and a step formed between the small-diameter housing and the large-diameter housing.

A valve element communicating portion that communicates with the valve element housing is provided to the small-diameter housing and a fail safe side opening that opens adjacent to the communication port is provided to the large-diameter housing. The fail safe side opening is closed by a closing member.

The fail-safe mechanism is provided with a valve plate member for closing the step, and a coil spring for biasing the valve plate member to the thermo-element side. An adapter for connecting a line used for connection to the radiator is provided to the third communication port that is connected to the radiator. The adapter is configured separately from the closing member.

PRIOR ART DOCUMENTS

Patent Documents

Patent Document 1: International Application Publication No. 2014/148126

SUMMARY OF THE INVENTION

Technical Problem

[1] A conventional valve device with a fail-safe mechanism forms a through-hole that communicates with the element housing in a peripheral wall of the valve element housing. However, it is difficult to process this through-hole, and in the molding methods (die casting, plastic molding) using a mold suitable for mass production, the degree of freedom of layout of lines, chambers, etc., is limited due to the structure of the mold. In some cases secondary processing is required, so there is the problem of low production efficiency.

In view of the above points, the present invention aims to provide a valve device with fail-safe mechanism that can achieve reduced size and provide improved production efficiency.

SUMMARY OF THE INVENTION

In order to achieve the above object, a valve device with fail-safe mechanism of the present invention comprises:
 a valve element housing having a valve element side opening;
 a communication port provided in the valve element housing;
 a fail-safe mechanism; and
 a valve element rotatably housed in the valve element housing, switching communication between the valve element side opening and the communication port;
 the fail-safe mechanism including:
 a thermo-element; and
 an element housing that accommodates the thermo-element,
 the element housing including:
 a small-diameter housing portion that houses a thermo-element;
 a large-diameter housing portion having an inner diameter larger diameter than an inner diameter of the small-diameter housing; and
 a step formed between the small-diameter housing portion and the large-diameter housing portion,
 one of the small-diameter housing portion and the large-diameter housing portion is provided with a valve element communicating portion communicating with the valve element housing,
 the fail-safe mechanism including:
 a closing member that closes the step; and
 a biasing portion that biases the closing member toward the thermo-element,
 an adapter provided to the communication port,
 the adapter having a through-hole for communicating the other of the small-diameter housing portion and the large-diameter housing portion with the communication port.

According to the present invention, since the adapter has a through-hole, it is possible to simplify the structure of the valve element housing, as compared to a case in which the through-hole is provided in the valve element housing like a conventional product.

[2] In the present invention, if a seal retention member is disposed in the communication port, and the adapter is made of plastic and includes an enlarged diameter portion to hold down the seal retention member and a prevention hole for preventing depressions due to molding shrinkage occurring in the enlarged diameter portion, it is preferable that the through-hole be formed so as to penetrate the prevention hole. In a case in which a plurality of prevention spaces is provided, the through-hole may be provided through at least one prevention space.

If the adapter is provided with a portion of enlarged diameter portion, which is enlarged to press down on the seal retention member, the seal retention member, by being appropriately held down by the enlarged diameter portion, enables a proper seal to be maintained between the valve element and the seal retention member.

However, in a case in which the adapter is made of molded plastic, there is a possibility that a depression (a so-called sink) is generated in the enlarged diameter portion due to molding shrinkage and the expanded diameter portion may not have an appropriate shape. If the enlarged diameter portion does not have the proper shape, it is impossible to generate a uniform surface pressure on the seal retention member with the enlarged diameter portion, and there is a risk that the seal between the seal retention member and the valve element is compromised.

For this reason, a space for preventing sink marks may be provided in the enlarged diameter portion. This prevention space prevents sink marks from occurring in the enlarged diameter portion, making it possible to apply a uniform surface pressure to the seal retention member by the enlarged diameter portion.

In a valve device with fail-safe mechanism having such a prevention space, it is preferable that the through-hole is formed so as to penetrate the protection space while being positioned in a portion where the protection space is provided. With such a configuration, it is possible to maintain the proper rigidity even with a through-hole provided in the adapter, and uneven pressure on the seal retention member exerted by the expanded diameter portion by forming the through-hole can be prevented.

[3] In the present invention, if one of the small-diameter housing portion and the large-diameter housing portion is provided with a valve element communicating portion communicating with the valve element housing, and the other of the small-diameter housing portion and the large-diameter housing portion is provided with a fail-safe side opening, it is preferable that the adapter has a cap that seals the fail safe side opening.

According to the present invention the adapter has the cap and the through-hole, so that, compared to the conventional product, in which the adapter and the cap are separately configured and the through-hole is provided in the valve element housing, the structure can be simplified, the number of parts can be reduced, and the number of assembly steps can also be reduced.

[4] In the present invention, the thermo-element presses the closing member against the biasing force of the biasing portion to release closing of the step by the closing member when a temperature of a fluid inside the element housing exceeds a predetermined temperature. Here, the predetermined temperature is set to a temperature at which it is preferable that the valve element housing and the communication port communicate with each other through a fail-safe mechanism by an experiment or the like.

[5] In the present invention, a biasing force of the biasing portion is set so that the closing of the step by the closing member is released when a pressure of a fluid inside the element housing exceeds a predetermined pressure. The predetermined pressure is set by experiments or the like to a pressure that preferably causes the valve element housing and the communication port to communicate with each other through the fail-safe mechanism.

[6] In the present invention, it is preferable that the adapter has a guide portion extending along the inner peripheral surface of the seal retention member. With such a configuration, it is possible to support the seal retention member from the inside with the guide portion, and seal retention member can be prevented from being inclined inside the communicating the mouth.

DETAILED DESCRIPTION OF THE INVENTION

First Embodiment

Figure 1:
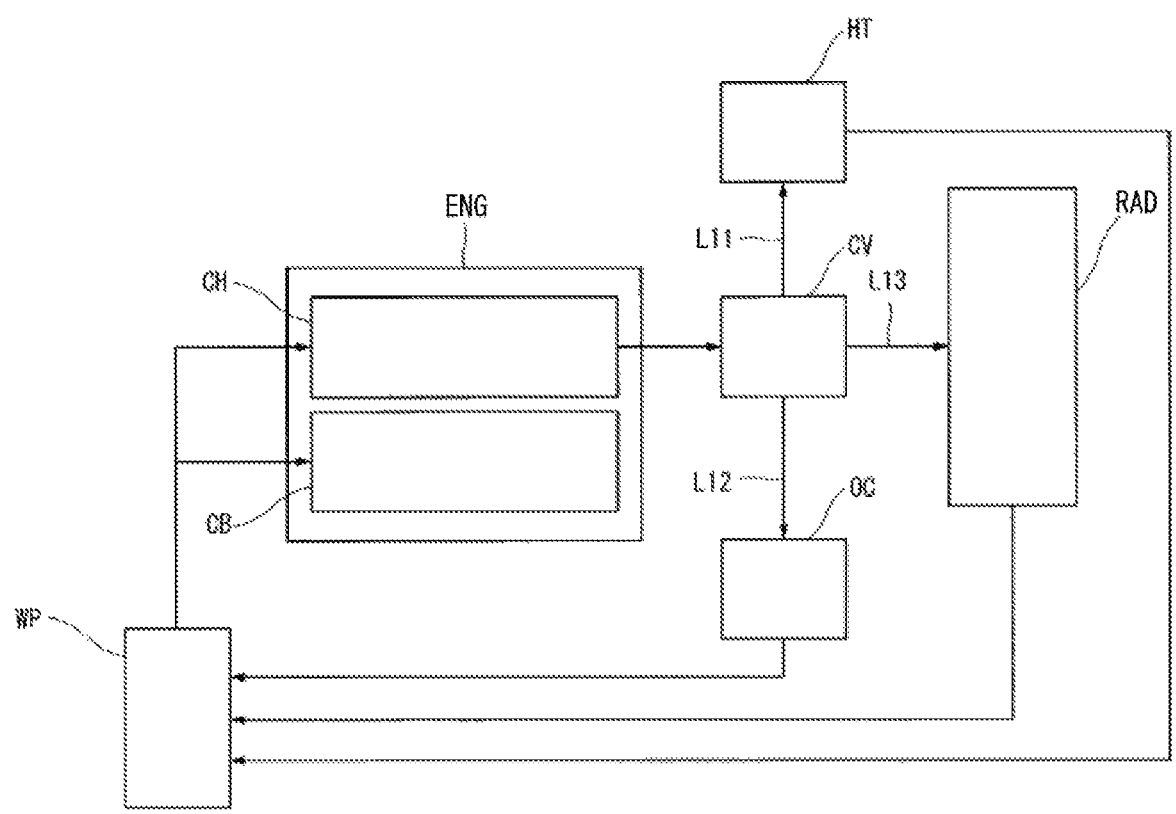
FIG. 1 is an explanatory diagram of a circulation system for an automotive coolant, showing a valve device with fail-safe mechanism of a first embodiment of the present invention.

As shown in FIG. 1, a control valve CV of a first embodiment as the valve device with fail-safe mechanism of the present invention is used for a circulation system for an automotive coolant, located on the side of the cylinder head CH of the engine ENG. The control valve CV distributes the coolant (fluid) pressurized by the water pump WP and passing through the cylinder head CH from the first to each of a heat exchanger HT, oil cooler OC, and radiator RAD via the first through third lines L11 to L13 while controlling each flow rate thereof.

Figure 2:
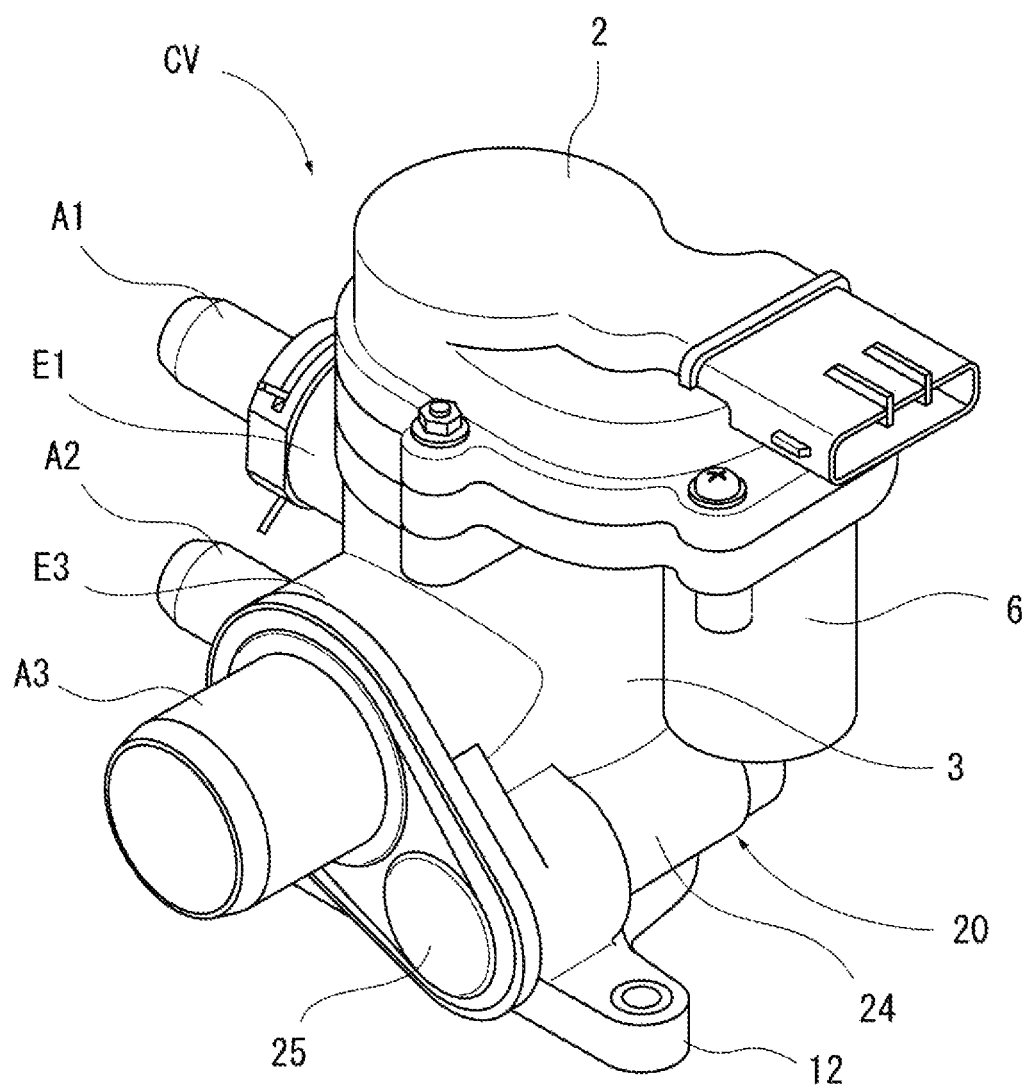
FIG. 2 is a perspective view of the valve device with fail-safe mechanism of the first embodiment.
Figure 3:
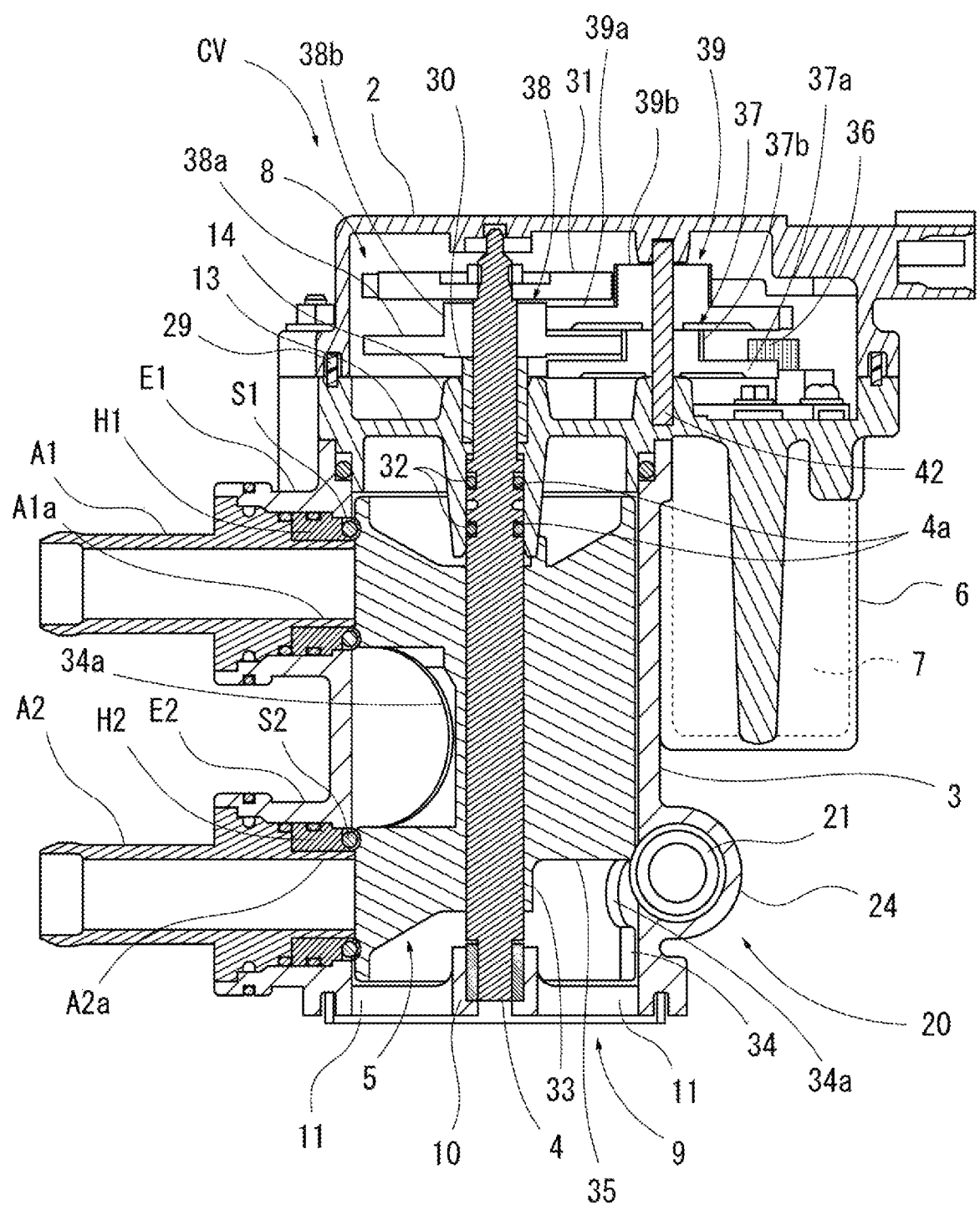
FIG. 3 is a vertical cross-sectional view of the valve device with fail-safe mechanism of the first embodiment.
Figure 4:
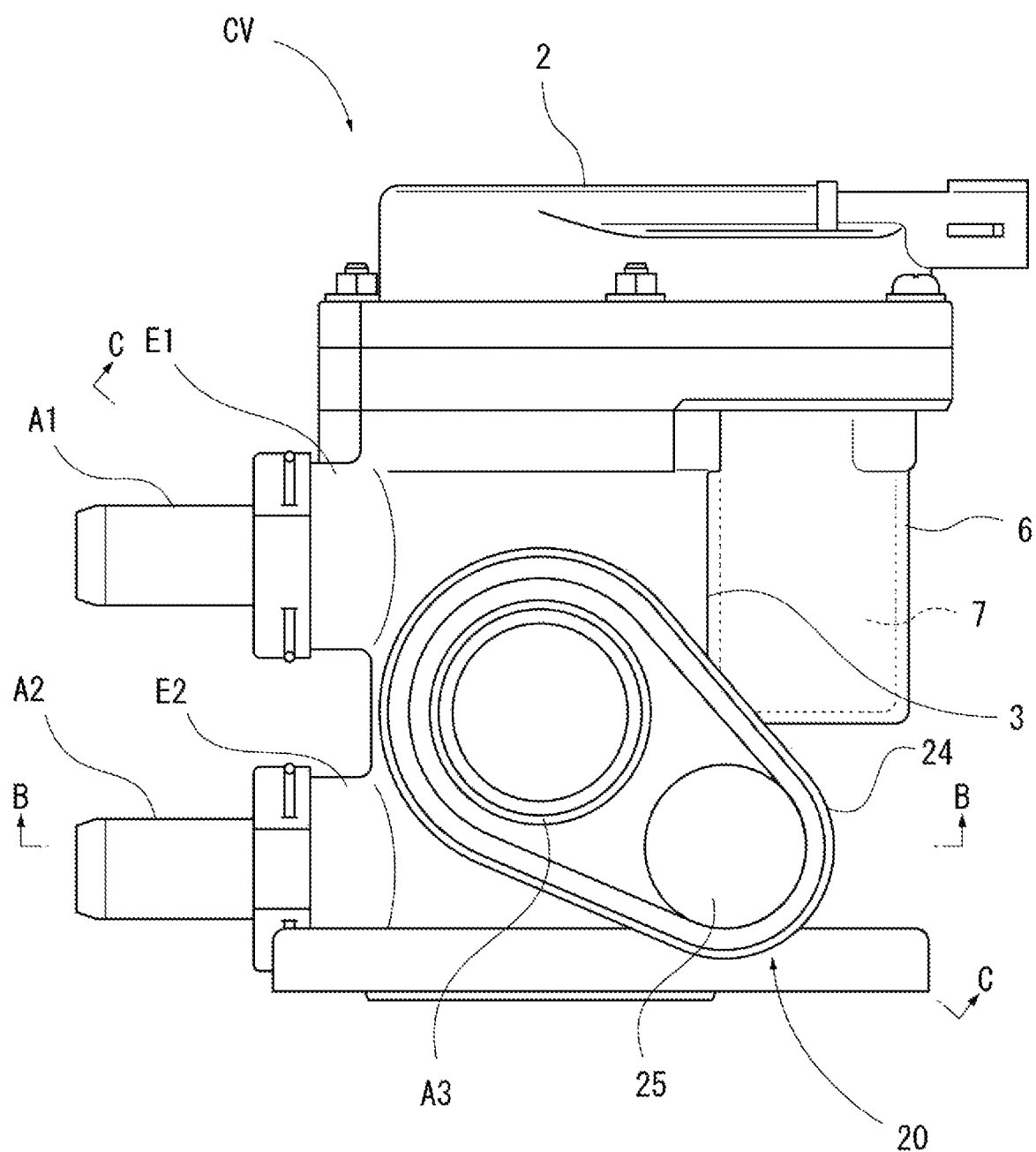
FIG. 4 is a front view of the valve device with fail-safe mechanism of the first embodiment.
Figure 5:
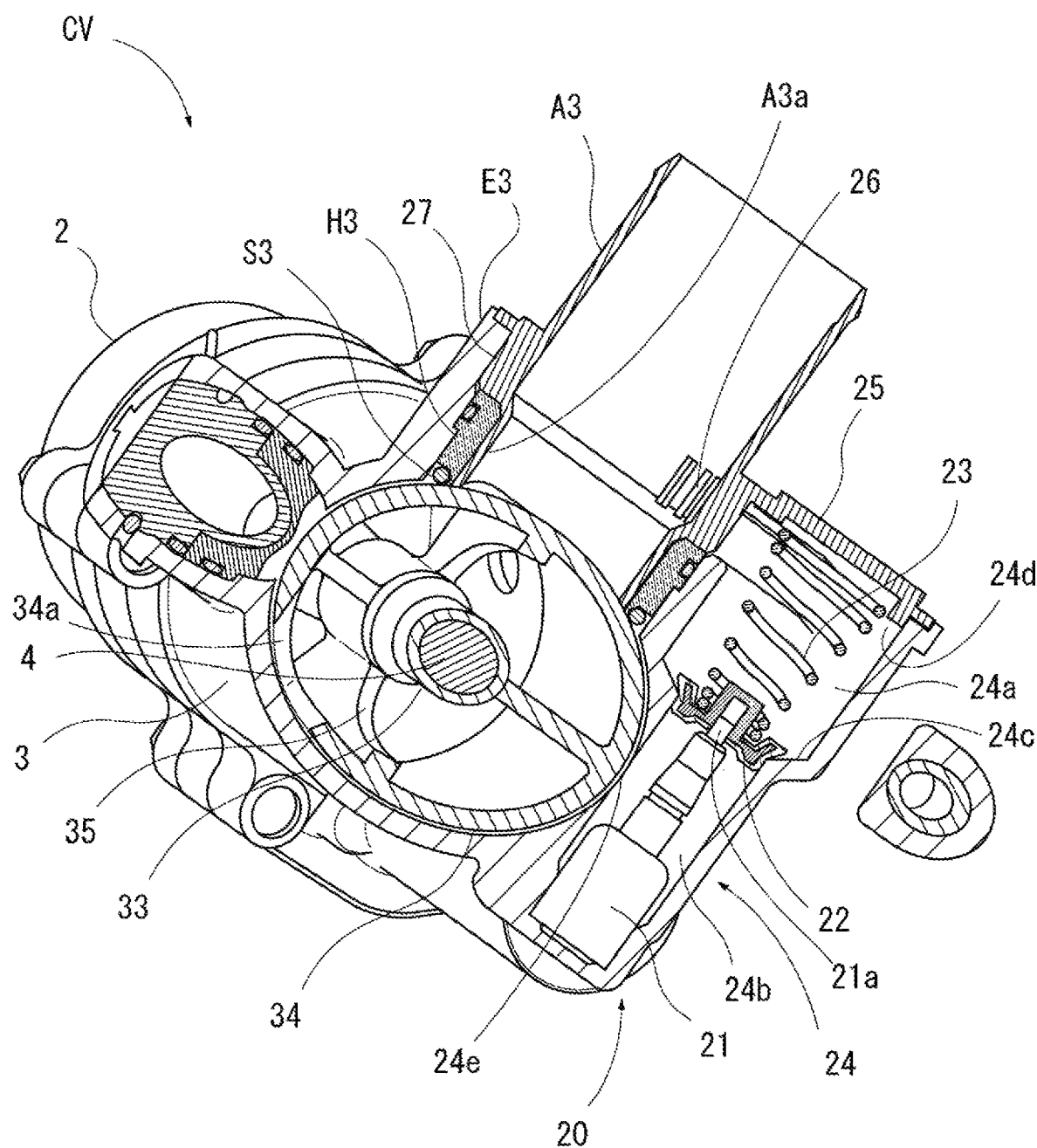
FIG. 5 is a cross-sectional view showing the valve device with fail-safe mechanism of the first embodiment along line C-C in FIG. 4.
Figure 6:
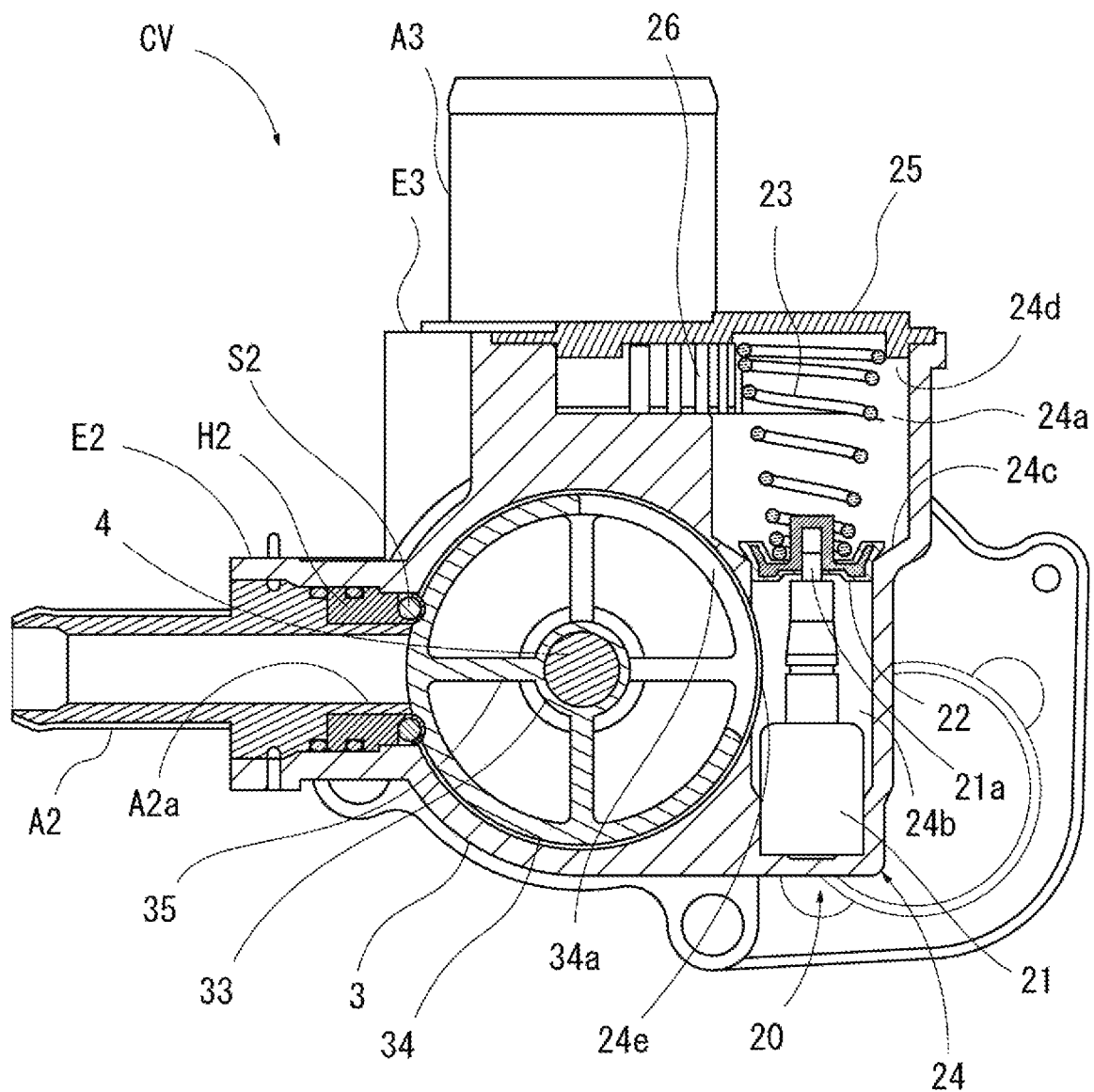
FIG. 6 is a cross-sectional view showing the valve device with fail-safe mechanism of the first embodiment along line B-B in FIG. 4.
Figure 7:
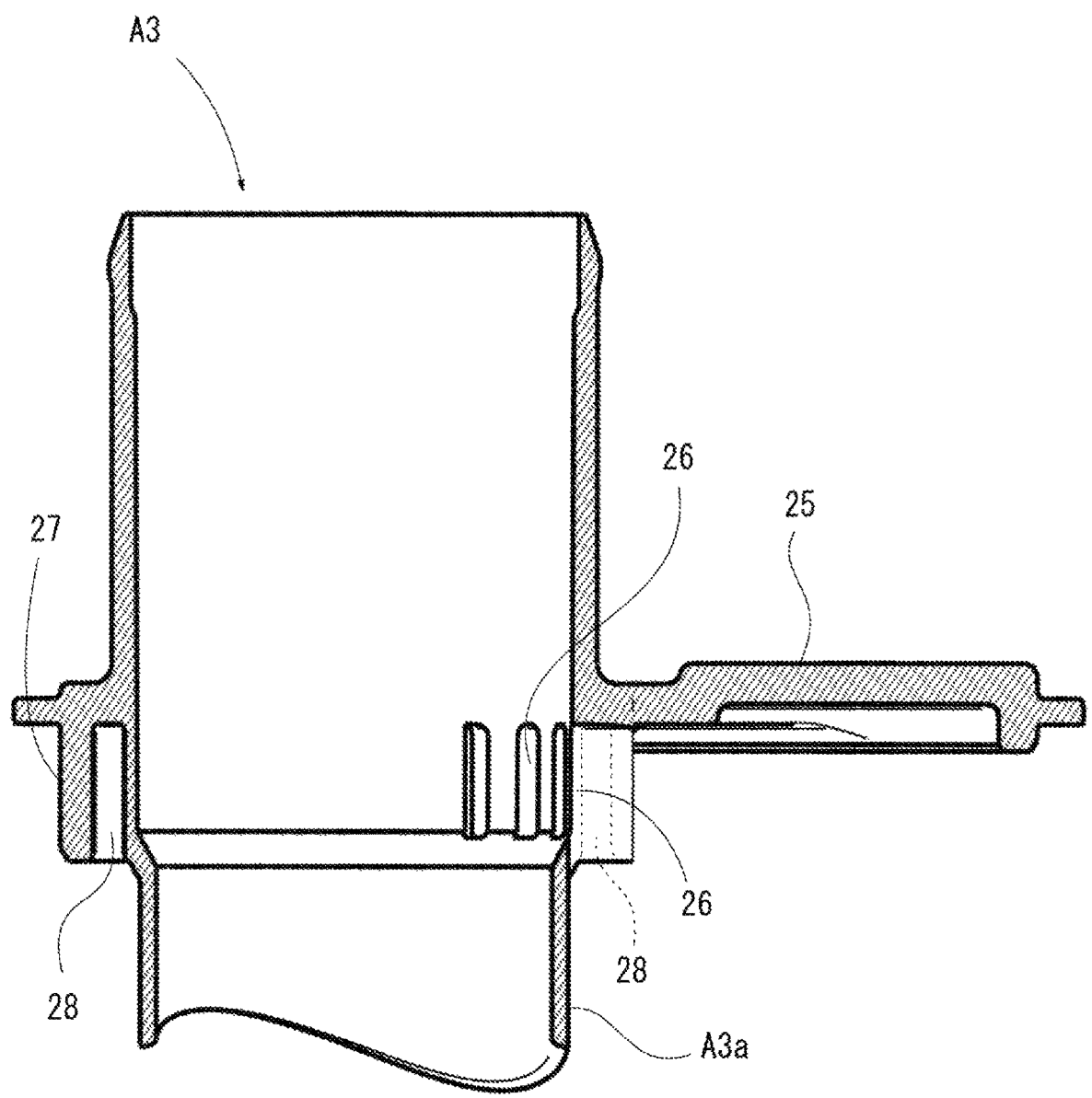
FIG. 7 is an explanatory diagram showing an adapter of the first embodiment.

As shown in FIG. 2, the control valve CV includes a reduction gear housing 2 having a transverse cross-section elongated in a lateral direction and extending to a side opposite the side on which the control valve CV is attached to the cylinder head CH (one end side); a substantially cylindrical valve element housing 3 connected to the inner surface of one end side in the lateral direction of the reduction gear housing 2; a rotary shaft 4 rotatably supported between the reduction gear housing 2 and the valve element housing 3; a valve element 5 positioned inside the valve element housing 3 and mounted integrally rotatably to the rotary shaft 4; a substantially cylindrical motor housing 6 disposed parallel to the valve element housing 3 and connected to the inner surface of the other lateral end side of the reduction gear housing 2; an electric motor 7 accommodated in the motor housing 6; and a reduction gear 8 disposed in the reduction gear housing 2.

The reduction gear housing 2, the valve element housing 3, and the motor housing 6 are each molded from plastic. It should be noted that the molding material of the reducer housing 2, the valve element housing 3, and the motor housing 6 is not limited to plastic, and thus, for example, the reducer housing 2, the valve element housing 3, and the motor housing 6 may be molded by casting with an aluminum alloy. The reduction gear housing 2, the valve element housing 3 and the motor housing 6 are fixed to each other with bolts, nuts, and screws.

A valve element side opening 9 communicating with the cylinder head CH and taking in coolant is opened and formed in the side of the valve element housing 3 opposite the side connected to the reduction gear housing 2. A support portion 10 that supports an end portion of the rotary shaft 4 on the valve element side opening portion 9 side is disposed at the center of the valve element side opening 9. The support part 10 is supported by bridges 11 extending from each of the four inner walls of the valve element housing 3 toward the support part 10 and forming a cross shape. It should be noted that the shape of the bridge portion 11 is not limited to the cross shape, and thus, for example, the bridge portion 11 may be formed in substantially a Y shape extending in three directions at equal intervals in the circumferential direction, or substantially an I shape extending in two directions.

A first projecting portion 12 projecting radially outward is provided on the opening end side of the valve element housing 3 where the valve element side opening 9 is formed. Using this first projecting portion 12, the control valve CV is fixed in place on the cylinder head CH.

A lid portion 13 for closing the opening end portion of the valve element housing 3 on the reduction gear housing 2 side is provided on the end of the motor housing 6 on the reduction gear housing 2 side. The motor housing 6 and the lid portion 13 form a single integrated unit. A cylindrical insertion tube portion 14 which supports the rotary shaft 4 inserted therethrough is provided in the center of the lid portion 13.

The reduction gear housing 2 is attached to the motor housing 6 and the lid portion 13 with screws or the like. In addition, the reduction gear housing 2 and the valve element housing 3 are fixed by bolts and nuts with the lid portion 13 sandwiched therebetween.

Three substantially cylindrical communication ports E1-E3 that provide connections to the first through third lines L11-L13 project radially outward from the outer periphery of the valve element housing 3. The inner diameter of the first communication port E1 is set to be the same as the inner diameter of the small diameter of the second communication port E2. The inner diameter of the third communication port E3 is set to be larger than the inner diameter of the small diameter of the first communication port E1 and the second communication port E2. In the first embodiment, the third communication port E3 corresponds to the communication port of the present invention.

The first communication port E1 is disposed on the reduction gear housing 2 side of the valve element housing 3, and is connected to the first line L11 and communicates with the heat exchanger HT. The second communication port E2 is disposed closer to valve element side opening 9 than to first communication port E1, and is connected to second line L12 and communicates with the oil cooler OC. The third communication port E3 is connected to the third line L13 and communicates with the radiator RAD.

The first communication port E1 and the second communication port E2 protrude radially outward in the same direction from the circumference of the valve element housing 3. The third communication port E3 protrudes outward in the radial direction while changing the phase by 90° from the first communication port E1 and the second communication port E2. The third communication port E3 is positioned between the first communication port E1 and the second communication port E2, in the axial direction of the rotary shaft 4.

First to third sealing retention members H1-H3 having cylindrical shapes are fitted to the three communicating openings E1-E3 first to third, respectively. In the three seal retention members H1-H3, three annular seal members S1-S3 that seal fluid-tight the space between and the outer peripheral surface of the valve element 5 are slidably disposed around the outer peripheral surface of the valve element 5 at opposite ends of the valve element 5.

Further, cylindrical first and second adapters A1 and A2 are inserted and fixed in place by annular clips inside the first and second of the two communication ports E1 and E2, A cylindrical third adapter A3 is laser-welded to the inside of the third communication port E3. The three adapters A1-A3 each holds one of the first through third cylindrical seal retention members H1-H3 inside a corresponding one of the first through third communication ports E1-E3.

Further, three guide portions A1a, A2a, A3a, each extending along the inner peripheral surface of a corresponding one of the first through third retention members H1-H3, are each provided to the three adapters A1-A3. Each of the first through third retention members H1-H3 is supported from the inside by one of the first through third guide portions A1a, A2a, A3a. As a result, it is possible to prevent each one of the first to third seal retention members H1-H3 from tilting inside the corresponding first to third communication ports E1-E3.

Each of the first through third lines L11-L13 is connected to the tip of a respective one of the three adapters A1-A3. In the first embodiment, the third adapter A3 corresponds to the adapter of present invention.

The three lines L11-L13 are made of a flexible material (e.g., rubber), fitted over a respective one of the first to third adapters A1-A3 and fixed in place with a band member. It should be noted that the method of connecting the lines L11-L13 and the adapters A1-A3 is not limited to fixing with a band member. For example, O-rings may be attached to each of the lines L11-L13 and inserted into the adapters A1-A3 and fixed in place.

A fail-safe mechanism 20 that enables communication between the valve element housing 3 and third communication port E3 when it is not possible to drive the valve element 5 due to a breakdown or when a predetermined pressure or a predetermined temperature are reached, is provided to the third communication port E3. The fail-safe mechanism 20 keeps open the coolant supply path to the radiator RAD even when the valve element 5 does not move due to a failure or the like, whereby overheating of engine ENG can be prevented.

The fail-safe mechanism 20 includes a thermo-element 21, a valve plate member 22, and a coil spring 23, and operates on the same principle as a wax-pellet type thermostat.

The fail-safe mechanism 20 is now described in detail. The fail-safe mechanism 20 includes an element housing 24 that has a cylindrical shape and communicates with the interior of the valve element housing 3, is formed as a single integrated unit with the valve element housing 3, and houses the thermo-element 21, the valve plate member 22, and the coil spring 23. One end of the element housing 24 is closed, the thermo-element 21 is disposed thereat, and at the other end, a fail-safe side opening 24d adjacent to the third communication port E3 and opening outward is provided.

The element housing 24 is composed, in order from the open end side (other end) toward the closed end side (one end side), of a large-diameter housing portion 24a and a small-diameter housing portion 24b, with a step 24c formed between the large-diameter housing portion 24a and the small-diameter housing portion 24b. The thermo-element 21 is housed in the small-diameter housing portion 24b. Further, the element housing 24 communicates with the valve element housing 3 through a valve element communicating portion 24e provided in the middle of the small-diameter housing portion 24b.

Valve plate member 22 is disposed at the step 24c and biased toward the thermo-element 21 side by the coil spring 23, thus preventing the passage of coolant between the large-diameter housing portion 24a and the small-diameter housing portion 24b. In the first embodiment, the valve plate member 22 corresponds to the closing member of the present invention, and the coil spring 23 corresponds to a biasing portion of the present invention.

The third adapter A3 is provided with a cap 25 for closing the fail-safe side opening 24d in the element housing 24. The third adapter A 3 is provided with a through-hole 26 that enables the third communication port E3 and the element housing 24 to communicate with each other.

The thermo-element 21 is filled with wax. When the temperature of the coolant (fluid) in the element housing 24 exceeds a predetermined temperature, the wax expands and the rod 21a accommodated in the thermo-element 21 protrudes. As the rod 21a protrudes, the valve plate member 22 moves toward the cap 25 against the biasing force of the coil spring 23, and the coolant can freely pass between the large-diameter housing portion 24a and the small-diameter housing portion 24b. Through experimentation or the like, the predetermined temperature is set to a preferable temperature at which the valve element side opening 9 of the valve element housing 3 and the third communication port E3 are communicated with each other through the fail-safe mechanism 20.

Further, besides the coolant temperature exceeding the predetermined temperature, in the fail-safe mechanism 20, even when the coolant (fluid) pressure exceeds the predetermined pressure, the valve plate member 22 moves against the biasing force of the coil spring 23 so that coolant can freely pass between the large-diameter housing portion 24a and the small-diameter housing portion 24b. Through experimentation or the like, the predetermined pressure is set to a preferable temperature at which the valve element side opening 9 in the valve element housing 3 communicates with the third communication port E3 through the fail-safe mechanism 20.

Between the reduction gear housing 2 and the motor housing 6 including the lid portion 13, a reduction gear seal 29 made of an annular seal member is provided and made liquid-tight to prevent water from entering the reduction gear housing 2.

The rotary shaft 4 is rotatably supported in the insertion tube portion 14 by a bushing 30. In the valve element housing 3, the valve element 5 is attached to the rotary shaft 4. In the reduction gear housing 2, a rotary gear 31 as a component part of the reduction gear 8 is attached to the rotary shaft 4 so as to rotate together with the rotary shaft 4.

In the insertion tube portion 14, the rotary shaft 4 is provided with two annular grooves 4a. Sealing rings 32 are provided in each of these annular grooves 4a. The sealing rings 32 are subjected to a process for reducing friction such as fluorine plastic processing. By this friction-reducing process, the frictional resistance of the rotary shaft 4 can be reduced and the power consumption of the electric motor 7 can be reduced. Further, the sealing rings 32 prevent coolant in the valve element housing 3 from entering the reduction gear housing 2 from inside the insertion tube portion 14.

The valve element 5 includes an inner cylinder 33 attached to the rotary shaft 4, an outer cylinder 34 capable of closing the first to third communication ports E 1 to E 3, and a connecting section 35 having a cross-shaped cross-section for connecting the inner cylinder 33 and the outer cylinder 34. The valve element 5 can rotate through a range of about 180°. A notch 34a is formed in the outer cylinder 34 so that, by changing the angle of the valve element 5, the state of communication between the valve element side opening 9 and the first to third communication ports E 1 to E 3 can be switched.

The third adapter A3 is molded from a plastic material and has an enlarged diameter portion 27 that is enlarged in diameter to hold down the third seal retention member H3. By suitably holding down the third seal retention member H3 with the enlarged diameter portion 27, a proper seal can be established between the seal retention member H 3 and the valve element 5.

However, when a depression (a so-called sink) is generated in the enlarged diameter portion 27 due to molding shrinkage and the expanded diameter portion 27 is not in the proper shape, uniform surface pressure cannot be exerted on the third seal retention member H3 and the seal between the third seal retention member H 3 and the valve element 5 may be compromised.

For this reason, a plurality of hole-shaped prevention spaces 28 for preventing sinks are provided in the enlarged diameter portion 27 at intervals around the circumference of the enlarged diameter portion 27. These prevention spaces 28 prevents sink marks from occurring in the enlarged diameter portion 27 so that it is possible to apply uniform surface pressure exerted on the third seal retention member H3 with the enlarged diameter portion 27.

In addition, in the control valve CV of the present embodiment, the through-hole 26 is formed so as to penetrate the prevention spaces 28 at a position where the prevention spaces 28 are provided. Therefore, even if the through-hole 26 is provided in the third adapter A3, proper rigidity can be maintained and it is also possible to prevent the pressure exerted on the third seal retention member H3 by the expanded diameter portion 27 from becoming non-uniform.

Note that it is sufficient that the through-hole 26 penetrate at least one of the plurality of prevention spaces 28.

Compared with the conventional configuration, in which the third adapter and the cap are separately formed and the through-hole is provided in the valve element housing, the structure can be simplified and the number of parts can be reduced, so that it is possible to reduce the number of assembly steps.

Furthermore, since other welding methods can be adopted for the third adapter A3, such as laser welding, vibration welding, etc., freedom of design and production can be improved, and production efficiency can be improved.

More specifically, when the third adapter A3 having the cap 25 is pressed and fitted into the third communication port E3 and the fail-safe side opening portion 24d, a space (insertion margin) for fitting must be provided, leading to an increase in the size of the control valve CV. Moreover, when each part is molded from plastic, it is difficult to fit the plastic members to each other, and further, the sealing is poor. In addition, in the case of a plastic material to which fiberglass or the like is added, which is commonly used for automotive cooling parts, since elasticity is small, the fitted side may be broken.

Also, when fastening each part with bolts, a rubber ring for sealing is required. For this reason, it is necessary to provide a rubber ring installation groove and to provide a bolt hole, which leads to a further increase in the size of the control valve CV. In addition, it is also necessary to carefully control the tightening torque of the bolt, which increases the number of assembly steps.

Therefore, welding the third adapter A3 can solve the problems of an increase in size, poor sealing, cracking, increase in the number of assembly steps, as compared with the case of pressing and fitting.

The method of fixing the third adapter A3 to the third communication port E3 is not limited to laser welding or vibration welding. For example, although compactness cannot be achieved, the third adapter A3 may be fixed to the third communication port E3 by bolting, clipping, crimping, or the like.

The electric motor 7 is controlled by an electronic control unit (ECU) mounted on the vehicle, and appropriately distributes coolant to the radiator RAD or the like by controlling the rotation of the valve element 5 depending on the vehicle state.

The reduction gear 8 is composed of a pinion 36 provided on an output shaft extending from the electric motor 7 into the reduction gear housing 2, a large gear 37a meshing with the pinion 36, and a small gear 37b smaller than the large gear 37a and concentric with and integrated into the large gear 37a, a first spur gear 37 rotatably supported by the rotary shaft 42 in the reduction gear housing 2, a large gear 38a meshing with the small gear 37b, a small gear 38b c smaller than the large gear 38a and concentric with and integrate into the large gear 38a, a second spur gear 38 rotatably supported by the rotary shaft 4 in the reduction gear housing 2, a large gear 39a that meshes with the small gear 38b, a small gear 39b smaller than the large gear 39a and concentric with and integrated into the large gear 39a, a third spur gear 39 which is rotatably supported in the reduction gear housing 2 about the same axis as the first spur gear 37, and a rotary gear 31 meshing with the small gear 39b and rotates together with the rotary shaft 4.

Second Embodiment

Figure 8:
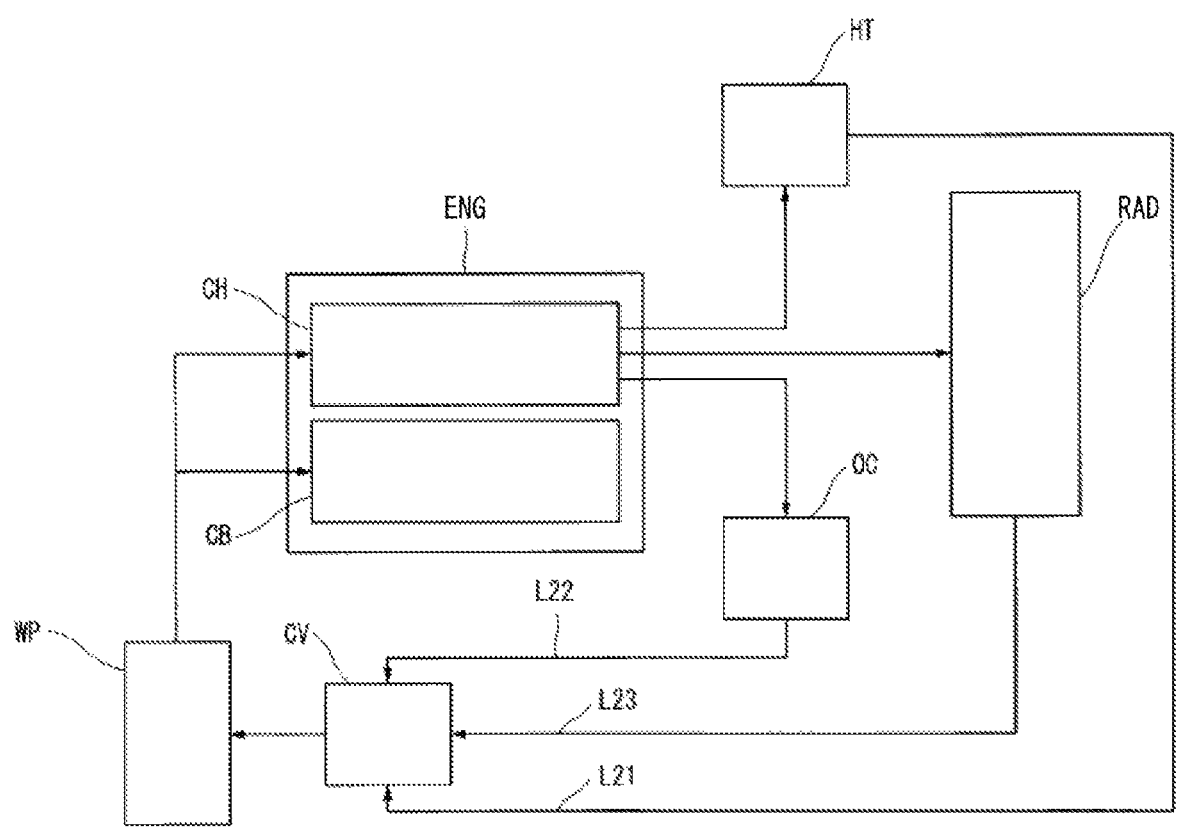
FIG. 8 is an explanatory diagram of a circulation system for an automobile coolant, showing a second embodiment of a control valve of present invention.

FIG. 8 shows the second embodiment of the coolant circulation system using the valve device with fail-safe mechanism of the present invention. The circulation system of the second embodiment is a modification of the disposition of the control valve CV in the first embodiment. In the second embodiment, components identical to those of the first embodiment are denoted by the same reference numerals and a description thereof omitted.

In the second embodiment, the control valve CV is provided between the water pump WP and the three line L21-L23 that form the flow path of the coolant flowing through the heat exchanger HT, oil cooler OC, and radiator RAD. By controlling the amount of coolant supplied from each of the three lines L21-L23, the control valve CV controls the flow rate of each of the heat exchanger HT, oil cooler OC, and radiator RAD.

In the second embodiment of the coolant circulation system for automobiles, since the water pump WP and the control valve CV are disposed adjacent to each other, they can be formed as a single integrated unit. Also, in the circulation system of the second embodiment, the pressure of the coolant supplied to the control valve CV is lower than that of the first embodiment. Therefore, the requirements for the three seal members S1-S3 and the sealing rings 32 can be relaxed, providing a control valve CV with improved responsiveness at start-up and enabling the electric motor 7 to be made more compact.

In the control valve CV of the second embodiment, the fail-safe side opening 24d opening adjacent to the third communication port E3 is provided in the small-diameter housing portion 24b and the valve element communicating portion 24e communicating with the valve element housing 3 is provided to the large-diameter housing portion 24a. The cap 25 formed as a single integrated unit with the third adapter 3 of the second embodiment closes the fail-safe side opening 24d provided in the small-diameter housing portion 24b.

Third Embodiment

Figure 9:
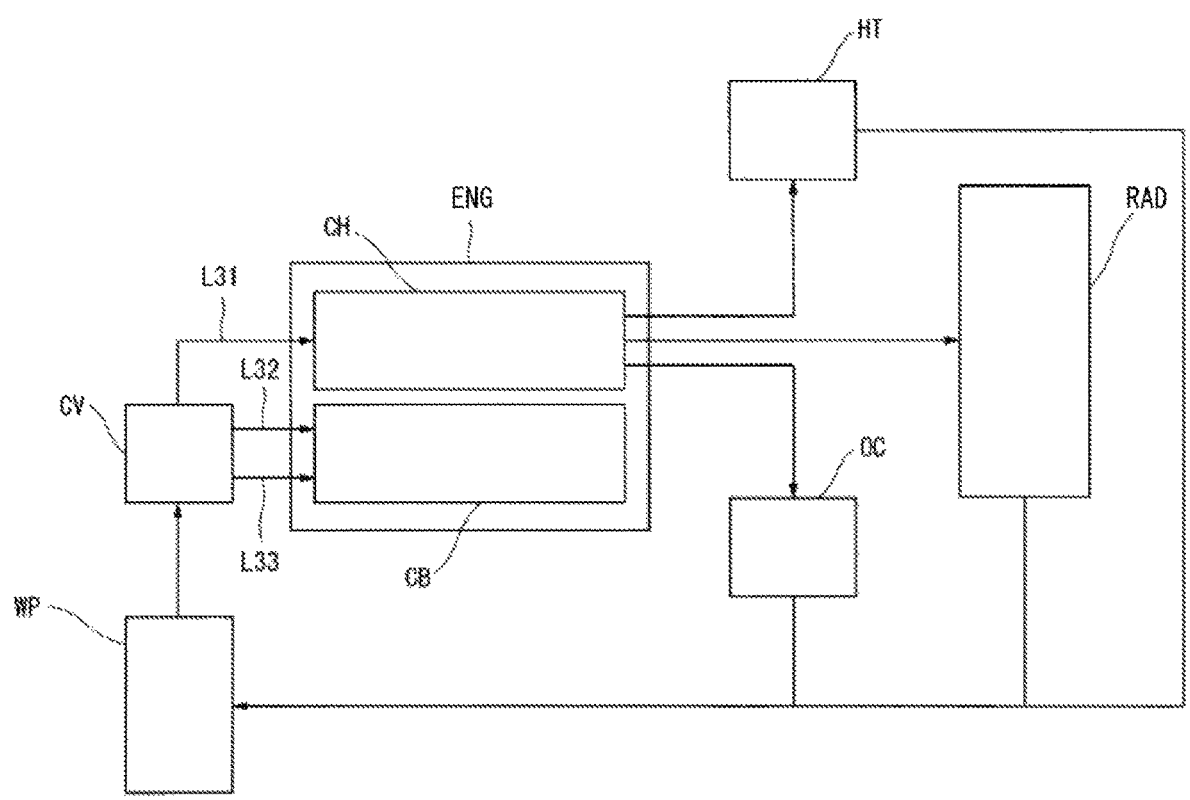
FIG. 9 is an explanatory diagram of a circulation system for an automotive coolant, showing a third embodiment of the control valve of the present invention.

FIG. 9 shows a third embodiment of a coolant circulation system using the control valve of the present invention. The circulation system of the third embodiment is a modification of the disposition of the control valve CV of the first embodiment. In the third embodiment, components identical to those of the first embodiment are denoted by the same reference numerals and description thereof omitted.

The control valve CV of the third embodiment is interposed between the Water Pump WP and the engine ENG. The control valve CV distributes and controls the flow rate of coolant supplied from the water pump WP through the three lines L31-L33 to the engine ENG cylinder head CH and cylinder block CB.

In the third embodiment as well, the water pump WP and control valve CV are disposed adjacent to each other. Therefore, the water pump WP and the control valve CV can be formed as a single integrated unit. Furthermore, in the third embodiment, provided are first line L31 distributing to the cylinder head CH coolant that is relatively high in temperature and requires a relatively high cooling effect among all the parts of the engine ENG, and second and third lines L32, L33 that distribute coolant to the cylinder block CB for which the required cooling effect varies with the cylinder stroke position. As a result, it is easy to control the control valve CV according to the required cooling action, and the temperature of the engine ENG can be precisely controlled.

Other Embodiments

In the first through third embodiments a description has been given of a control valve CV as the valve device with fail-safe mechanism of the present invention. However, the valve device with fail-safe mechanism of the present invention is not limited thereto, and may, for example, be an on-off valve with a fail-safe mechanism instead of a control valve. Further, for the present invention, the material of each member, the positions of the various lines, and their dispositions on the cooling circuit as described in the embodiments may be modified as appropriate.

LIST OF REFERENCE SIGNS

CV Control valve (valve device with fail-safe mechanism)
ENG Engine
CH Cylinder head
WP Water pump
L11-L13 Lines
HT Heat exchanger
OC Oil cooler
RAD Radiator 2 Reduction gear housing
3 Valve element housing
4 Rotary shaft
4A Annular grooves
5 Valve element
6 Motor housing
7 Electric motor
8 Reduction gear
9 Valve element side opening
10 Supporting portion
11 Bridge portion
12 First projecting portion
13 Lid portion
14 Through tubular unit
20 Fail-safe mechanism
21 Thermo-element
22 Valve plate member (closing member)
23 Coil spring
24 Element housing
24a Large-diameter housing portion
24b Small-diameter housing portion
24c Step
24d Fail-safe side opening
24e Valve element communicating portion
25 Cap
26 Through-hole
27 Enlarged diameter portion
28 Prevention spaces
29 Reduction gear seal
30 Bushing
31 Rotary gear
32 Sealing rings
33 Inner cylinder
34 Outer cylinder
34a Notch
35 Connecting portion
36 Pinion
37 First spur gear
37a Large gear
37b Small gear
38 Second spur gear
38a Large gear
38b Small gear
39 Third spur gear
39a Large gear
39b Small gear
42 Rotary shaft
E1 to E3 First to third communication ports
H1 to H3 First to third seal retention members
S1 to S3 First to third seal members
L11 to L13 Lines
L21 to L23 Lines
L31 to L33 Lines
A1 to A3 First to third adapters
A1a to A3a First to third guide portions

The invention claimed is:

1. A valve device with fail-safe mechanism comprising:
   a valve element housing having a valve element side opening;
   a communication port provided in the valve element housing;
   a fail-safe mechanism; and
   a valve element rotatably housed in the valve element housing, switching communication between the valve element side opening and the communication port;
   the fail-safe mechanism including:
   a thermo-element; and
   an element housing that accommodates the thermo-element,
   the element housing including:
   a small-diameter housing portion that houses the thermo-element;
   a large-diameter housing portion having an inner diameter larger than an inner diameter of the small-diameter housing portion; and
   a step formed between the small-diameter housing portion and the large-diameter housing portion,
   one of the small-diameter housing portion and the large-diameter housing portion is provided with a valve element communicating portion communicating with the valve element housing,
   the fail-safe mechanism including:
   a closing member that closes the step; and
   a biasing portion that biases the closing member toward the thermo-element,
   an adapter provided to the communication port,
   the adapter having a through-hole for communicating the other of the small-diameter housing portion and the large-diameter housing portion with the communication port,
   wherein a seal retention member is disposed in the communication port,
   the adapter is made of plastic and includes an enlarged diameter portion to hold down the seal retention member and a prevention hole for preventing depressions due to molding shrinkage occurring in the enlarged diameter portion, and
   the through-hole is formed so as to penetrate the prevention hole.

2. The valve device with fail-safe mechanism according to claim 1,
   wherein one of the small-diameter housing portion and the large-diameter housing portion is provided with flail the valve element communicating portion communicating with the valve element housing, and the other of the small-diameter housing portion and the large-diameter housing portion is provided with a fail-safe side opening, and
   the adapter is provided with a cap that seals the fail-safe side opening.

3. The valve device with fail-safe mechanism according to claim 1,
   wherein the thermo-element presses the closing member against a biasing force of the biasing portion to release closing of the step by the closing member when a temperature of a fluid inside the element housing exceeds a predetermined temperature.

4. The valve device with fail-safe mechanism according to claim 1,
   wherein the biasing force of the biasing portion is set so that the closing of the step by the closing member is released when a pressure of a fluid inside the element housing exceeds a predetermined pressure.

5. The valve device with fail-safe mechanism according to claim 1, wherein a guide portion extending along an inner circumferential surface of the seal retention member is provided to the adapter.

* * * * *